United States Patent
Tarczewski et al.

(10) Patent No.: US 9,513,640 B2
(45) Date of Patent: Dec. 6, 2016

(54) FILL VALVE FOR USE WITH A PRESSURIZED FLUID CONTAINER

(75) Inventors: Jacek Tarczewski, Hrusovany u Brna (CZ); Richard Edwards, Staffordshire (GB); Simon Gass, Staffordshire (GB)

(73) Assignee: Norgren Limited, Staffordshire (GB)

( * ) Notice: Subject to any disclaimer, the term of this patent is extended or adjusted under 35 U.S.C. 154(b) by 105 days.

(21) Appl. No.: 13/980,115

(22) PCT Filed: Feb. 7, 2012

(86) PCT No.: PCT/GB2012/000120
§ 371 (c)(1),
(2), (4) Date: Jul. 17, 2013

(87) PCT Pub. No.: WO2012/107716
PCT Pub. Date: Aug. 16, 2012

(65) Prior Publication Data
US 2013/0299024 A1 Nov. 14, 2013

(30) Foreign Application Priority Data

Feb. 9, 2011 (GB) .................................. 1102317.3
Feb. 9, 2011 (GB) .................................. 1102318.1
Feb. 9, 2011 (GB) .................................. 1102319.9

(51) Int. Cl.
*G05D 16/10* (2006.01)
*F17C 13/04* (2006.01)
(Continued)

(52) U.S. Cl.
CPC ............. *G05D 16/10* (2013.01); *F16K 31/56* (2013.01); *F16K 99/00* (2013.01); *F17C 13/04* (2013.01);
(Continued)

(58) Field of Classification Search
CPC ........ Y10S 137/91; F16K 31/56; F16K 99/00; F16K 13/06; F16K 13/04; G05D 16/10; F17C 13/04; F17C 2201/0109; F17C 2201/032; F17C 2201/056; F17C 2201/058; F17C 2205/0323; F17C 2205/0338; F17C 2205/0385; F17C 2205/0394; F17C 2221/011; F17C 2223/0123; F17C 2223/035; F17C 2223/036; F17C 2250/043; F17C 220/028; F17C 2260/02; Y10T 137/0491; Y10T 137/7793; Y10T 137/8811; Y10T 137/0497
(Continued)

(56) References Cited

U.S. PATENT DOCUMENTS 1,631,372 A * 6/1927 Harris ........................... 251/275
2,733,835 A * 2/1956 Alfery et al. ..................... 222/5
(Continued)

FOREIGN PATENT DOCUMENTS

DE 1263039 B 3/1968
DE 19645455 A1 5/1998
FR 1294833 A 6/1962

*Primary Examiner* — Jessica Cahill
*Assistant Examiner* — Daphne M Barry
(74) *Attorney, Agent, or Firm* — The Ollila Law Group LLC

(57) ABSTRACT

A fill valve (200) adapted for use with a pressurized fluid container includes a fill port (112) configured to be in fluidic communication with the pressurized fluid container and a fill valve member (201) configured for selectively blocking the fill port (112) and configured to be non-openable after the fill valve member (201) has been moved to a blocking position that substantially closes the fill port (112). The fill valve member (201) includes a valve member body (210) and a break-away head (220) joined to the valve member body (210) by a breakable neck (228). The breakable neck (228)
(Continued)

is configured to break when the fill valve member (201) is moved to a substantially fully closed position in the fill port (112).

13 Claims, 15 Drawing Sheets

(51) Int. Cl.
*F16K 31/56* (2006.01)
*F16K 99/00* (2006.01)

(52) U.S. Cl.
CPC .. *F17C 2201/0109* (2013.01); *F17C 2201/032* (2013.01); *F17C 2201/056* (2013.01); *F17C 2201/058* (2013.01); *F17C 2205/0323* (2013.01); *F17C 2205/0338* (2013.01); *F17C 2205/0385* (2013.01); *F17C 2205/0394* (2013.01); *F17C 2221/011* (2013.01); *F17C 2223/0123* (2013.01); *F17C 2223/035* (2013.01); *F17C 2223/036* (2013.01); *F17C 2250/043* (2013.01); *F17C 2260/028* (2013.01); *F17C 2270/02* (2013.01); *Y10T 137/0491* (2015.04); *Y10T 137/0497* (2015.04); *Y10T 137/7793* (2015.04); *Y10T 137/8811* (2015.04)

(58) Field of Classification Search
USPC .......................................................... 137/797
See application file for complete search history.

(56) References Cited

U.S. PATENT DOCUMENTS

| | | | | |
|---|---|---|---|---|
| 3,352,574 | A | * | 11/1967 | Arthur ................................ 285/3 |
| 3,472,427 | A | * | 10/1969 | Schaefer ......................... 222/147 |
| 4,762,140 | A | * | 8/1988 | Davis ................................ 137/71 |
| 5,005,883 | A | * | 4/1991 | Guiler ........................... 292/327 |
| 6,401,747 | B1 | * | 6/2002 | Cain ....................... F16K 3/0254 |
| | | | | 137/329.03 |
| 6,557,821 | B2 | * | 5/2003 | Girouard et al. ........... 251/30.03 |
| 7,066,062 | B2 | * | 6/2006 | Flesher ............................ 81/442 |
| 7,322,558 | B2 | * | 1/2008 | Cong .................. H01F 17/0006 |
| | | | | 137/614.2 |
| 9,069,360 | B2 | * | 6/2015 | Tarczewski ............. F17C 13/04 |
| 2005/0115987 | A1 | | 6/2005 | Bruat et al. |
| 2005/0269351 | A1 | | 12/2005 | Sato et al. |

* cited by examiner

FILL VALVE FOR USE WITH A PRESSURIZED FLUID CONTAINER

CROSS-REFERENCE TO RELATED APPLICATIONS

This is a National Stage entry of International Application No. PCT/GB2012/000120, with an international filing date of Feb. 7, 2012, which claims priority of Great Britain patent application no. 1102317.3, filed Feb. 9, 2011, entitled "FILL VALVE FOR USE WITH A PRESSURIZED FLUID CONTAINER" and Great Britain patent application no. 1102319.9, filed Feb. 9, 2011, entitled "PRESSURE REGULATOR" and Great Britain patent application no. 1102318.1, filed Feb. 9, 2011 entitled "OUTLET VALVE FOR USE WITH A PRESSURIZED FLUID CONTAINER".

BACKGROUND OF THE INVENTION

1. Field of the Invention

The invention is related to the field of valves, and more particularly, to a fill valve for use with a pressurized fluid container.

2. Description of the Prior Art

Pressurized gas containers are generally known in the art and are used for a wide variety of applications. The gas containers may comprise relatively large containers used in industrial applications for providing a pressurized gas supply to one or more workstations. Alternatively, the gas containers may comprise relatively small containers, which an individual user may carry. In some situations, the pressurized gas container may be designed as a one-time use container, which is discarded or recycled after the contents of the container are depleted completely or depleted to a predetermined minimum pressure. One example of an application that uses such a disposable pressurized container is taught by U.S. Pat. No. 7,604,774, which is directed towards a sterilization system utilizing a pressurized oxygen container to supply pressurized oxygen that is combined with water to produce ozone.

One of the major problems faced with pressurized gas containers is the inability to prevent refilling of the container. The pressurized gas container may not be designed or intended for refilling or re-use. Safety considerations may dictate that the pressurized gas container not be refilled or re-used.

Therefore, there is a need in the art for a fill valve that does not permit re-filling of the container.

ASPECTS OF THE INVENTION

In some aspects of the invention, a fill valve adapted for use with a pressurized fluid container comprises:
- a fill port configured to be in fluidic communication with the pressurized fluid container; and
- a fill valve member configured for selectively blocking the fill port and configured to be non-openable after the fill valve member has been moved to a blocking position that substantially closes the fill port, with the fill valve member comprising:
  - a valve member body; and
  - a break-away head joined to the valve member body by a breakable neck, wherein the breakable neck is configured to break when the fill valve member is moved to a substantially fully closed position in the fill port.

Preferably, the fill port connects to a fill conduit that places the fill port in fluidic communication with the pressurized fluid container and further comprising a fill valve bore that intersects the fill conduit, with the fill valve bore receiving the fill valve member, wherein the fill valve member can reside at unblocking and blocking positions in the fill valve bore.

Preferably, the breakable neck is formed physically smaller than one or both of the valve member body and the break-away head.

Preferably, the breakable neck is formed of a weaker material than one or both of the valve member body and the break-away head.

Preferably, the breakable neck includes one or more fracture features.

Preferably, the valve member body further includes a blocking portion configured to perform the selective blocking of the fill port.

Preferably, the valve member body further includes a blocking portion configured to substantially sealingly fit against a seal surface of the fill port and selectively block the fill port.

Preferably, the break-away head includes a manipulation feature.

Preferably, the breakable neck is configured to break at a predetermined installation condition when the fill valve member is moved to the substantially fully closed position in the fill valve.

In some aspects of the invention, a fill valve adapted for use with a pressurized fluid container comprises:
- a fill port connecting to a fill conduit that places the fill port in fluidic communication with the pressurized fluid container;
- a fill valve member configured for selectively blocking the fill port and configured to be non-openable after the fill valve member has been moved to a blocking position that substantially closes the fill port, with the fill valve member comprising:
  - a valve member body; and
  - a break-away head joined to the valve member body by a breakable neck, wherein the breakable neck is configured to break when the fill valve member is moved to a substantially fully closed position in the fill port; and
- a fill valve bore that intersects the fill conduit, with the fill valve bore receiving the fill valve member and the fill valve member can reside at unblocking and blocking positions in the fill valve bore.

Preferably, the breakable neck is formed physically smaller than one or both of the valve member body and the break-away head.

Preferably, the breakable neck is formed of a weaker material than one or both of the valve member body and the break-away head.

Preferably, the breakable neck includes one or more fracture features.

Preferably, the valve member body further includes a blocking portion configured to perform the selective blocking of the fill port.

Preferably, the valve member body further includes a blocking portion configured to substantially sealingly fit against a seal surface of the fill port and selectively block the fill port.

Preferably, the break-away head includes a manipulation feature.

Preferably, the breakable neck is configured to break at a predetermined installation condition when the fill valve member is moved to the substantially fully closed position in the fill valve.

In some aspects of the invention, a method of forming a fill valve adapted for use with a pressurized fluid container comprises:

forming a fill port in the fill valve, with the fill port adapted to be in fluidic communication with the pressurized fluid container;

forming a fill valve member configured to selectively block the fill port and configured to be non-openable after the fill valve member has been moved to a blocking position that substantially closes the fill port; and inserting the fill valve member partially into the fill valve, wherein the fill valve member will not substantially block the fill port and wherein the fill valve member is configured to be non-openable after the fill valve member has been moved to a blocking position that substantially closes the fill port.

Preferably, forming the fill valve member comprises forming a valve member body and forming a break-away head joined to the valve member body by a breakable neck, wherein the breakable neck is configured to break when the fill valve member is moved to a substantially fully closed position in the fill port.

Preferably, forming the breakable further comprises forming the breakable neck physically smaller than one or both of the valve member body and the break-away head.

Preferably, forming the breakable neck further comprises forming the breakable neck of a weaker material than one or both of the valve member body and the break-away head.

Preferably, forming the breakable neck further comprises including one or more fracture features.

Preferably, the breakable neck is configured to break at a predetermined installation condition when the fill valve member is moved to the substantially fully closed position in the fill valve.

BRIEF DESCRIPTION OF THE DRAWINGS

The same reference number represents the same element on all drawings. It should be understood that the drawings are not necessarily to scale.

DETAILED DESCRIPTION OF THE INVENTION

FIGS. 1-16 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
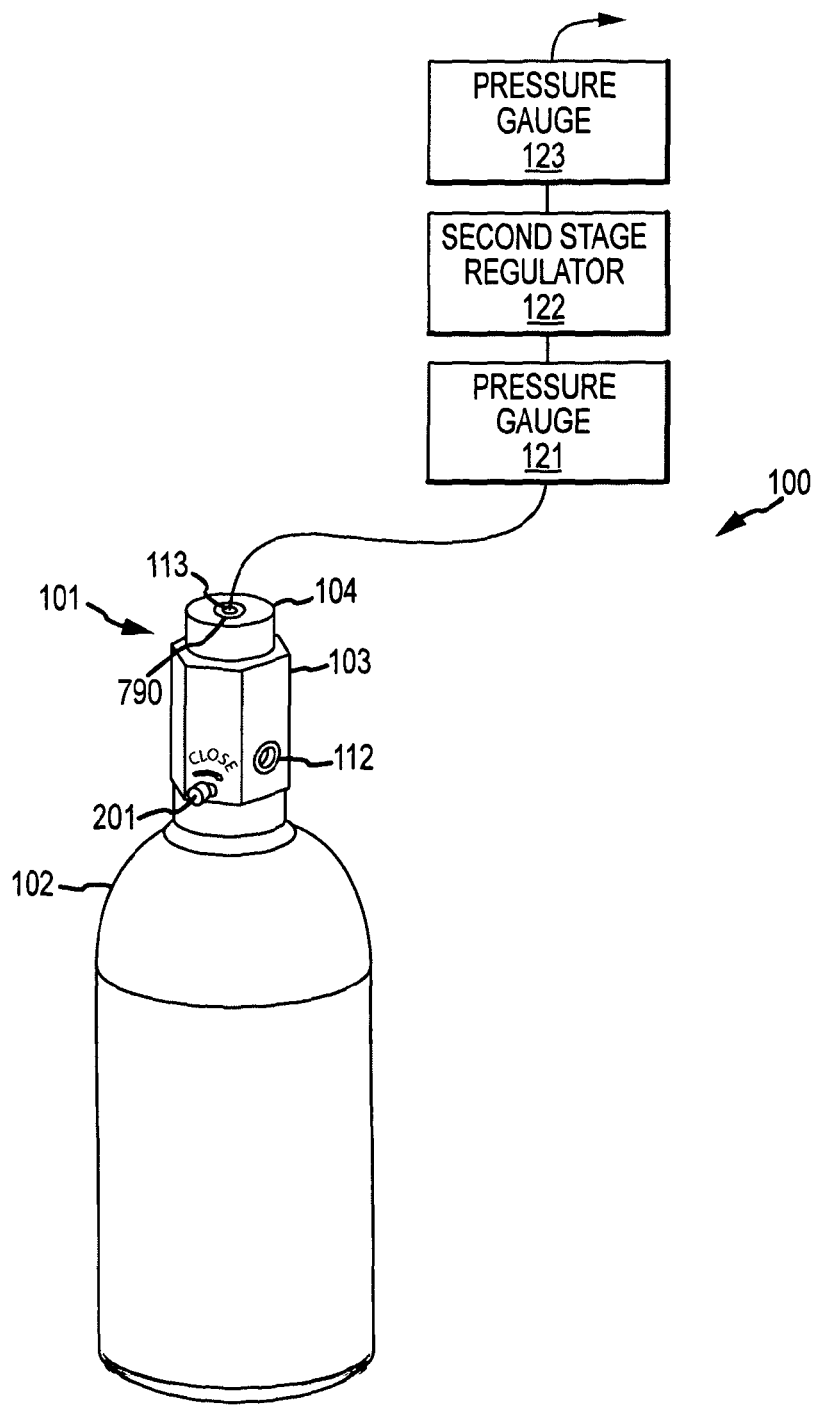
FIG. 1 shows a pressurized fluid system according to the invention.

FIG. 1 shows a pressurized fluid system 100 according to the invention. The pressurized fluid system 100 includes a pressurized fluid container 102 and a container interface 101. The pressurized fluid container 102 holds and dispenses fluids including liquids and/or gases. The pressurized fluid container 102 holds fluids at high pressures.

The container interface 101 is designed to be affixed to the pressurized fluid container 102. The container interface 101 may be permanently or removably affixed to the pressurized fluid container 102. The container interface 101 is designed to regulate the dispensation of fluid therefrom. The container interface 101 also controls the filling of the pressurized fluid container 102.

The container interface 101 in some embodiments can comprise a single-use interface. The container interface 101 can comprise an interface that does not permit refilling and/or reuse of the pressurized fluid container 102. The container interface 101 in some embodiments can control the release of pressurized fluid from the pressurized fluid container 102.

In some embodiments, the pressurized fluid container 102 can hold a gas, such as oxygen. Because oxygen will enable or enhance combustion, the manufacturer, distributor, and/or seller of the pressurized fluid container 102 may desire that the pressurized fluid container 102 be non-reusable and/or non-refillable. Further, for some applications, regulations may dictate that a fluid container be non-refillable, including for hygienic or safety reasons. When the pressurized fluid container 102 is empty or reaches a threshold minimum pressure, it may be desired that the pressurized fluid container 102 be able to be disposed of or even crushed, without danger.

As a result, in some embodiments the container interface 101 prevents refilling (and therefore re-use) of the pressurized fluid container 102. The pressurized fluid container 102 comprises a disposable container in some embodiments. The pressurized fluid container 102 therefore may be discarded when the fluid is consumed. Disposal may include the pressurized fluid container 102 being put into a waste disposal stream. The pressurized fluid container 102 may be crushed during waste processing as part of the waste disposal stream. Therefore, in some embodiments, the container interface 101 may ensure the pressurized fluid container 102 is open and exhausted to the atmosphere after being used. This may be desired in order to prevent excessive pressure buildup when crushed.

The pressurized fluid system 100 may be connected to and supply fluid to a variety of devices and can be employed in a variety of uses. For example, the pressurized fluid system 100 can be used in a variety of medical and industrial uses. In the embodiment shown, the pressurized fluid system 100 is connected to a first pressure gauge 121, a second stage regulator 122, and a second pressure gauge 123. The first pressure gauge 121 measures the fluid pressure delivered by the pressurized fluid system 100. It should be understood that the container interface 101 can include a first stage pressure regulator 500 in some embodiments (see FIG. 9 and the accompanying discussion below). In some embodiments, the first stage pressure regulator 500 within the container interface 101 may comprise a pressure reducer, wherein the second stage pressure regulator 122 exhibits fine pressure control and produces a substantially constant working pressure. The second pressure gauge 123 can measure the pressure developed by the second stage regulator 122.

The container interface 101 in some embodiments includes a lower body 103, an upper body 104, and an outlet valve actuator 790. The container interface 101 includes a fill port 112 that communicates with the interior of the pressurized fluid container 102 and a fill valve member 201 that allows only an initial fill operation through the fill port 112. The fill valve member 201 in some embodiments can allow an initial fill operation and can prevent any subsequent fill attempts (i.e., refills) through the fill port 112. The container interface 101 further includes an outlet port 113 that may be coupled to a container or device, wherein the pressurized fluid system 100 supplies pressurized fluid to the conduit or device. The outlet port 113 may be located on the outlet valve actuator 790.

Figure 2:
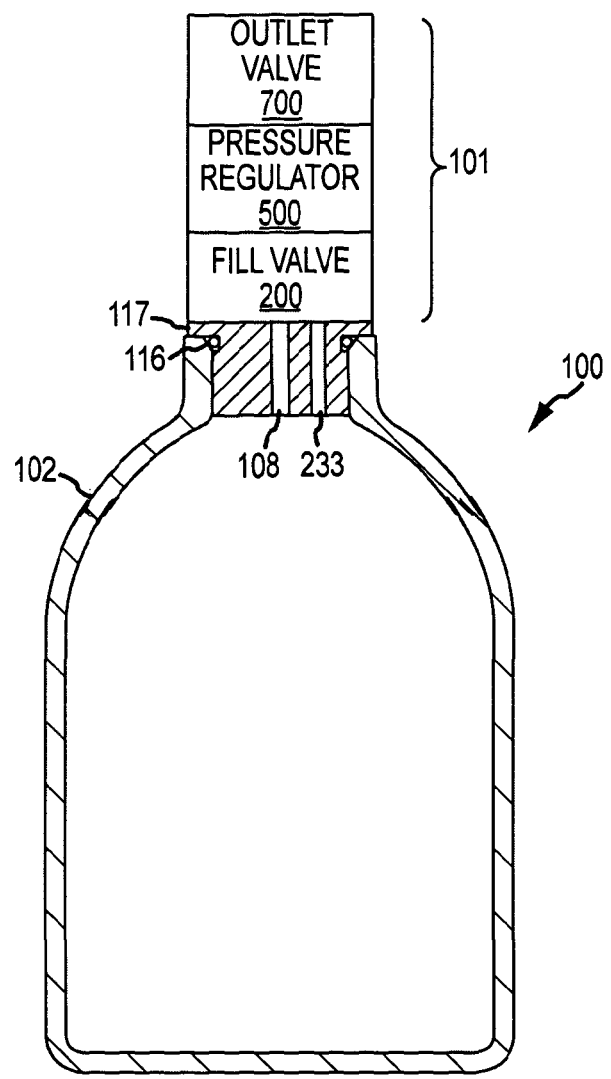
FIG. 2 shows components of the container interface according to an embodiment of the invention.

FIG. 2 shows components of the container interface 101 according to an embodiment of the invention. In the embodiment shown, the container interface 101 includes a stopper 117 including a seal 116, a delivery conduit 108, a fill conduit 233, a fill valve 200, a (first stage) pressure regulator 500, and an outlet valve 700.

The fill valve 200 is in fluid communication with the pressurized fluid container 102 via the fill conduit 233 and controls the filling of the pressurized fluid container 102. The fill valve 200 includes the fill port 112 shown in FIG. 1. The fill valve 200 may be independent of the pressure regulator 500 and the outlet valve 700. The fill valve 200 may be independent of the fluid being dispensed from the pressurized fluid container 102 via the delivery conduit 108 and the outlet port 113. The fill valve 200 may comprise a one-use fill valve 200 in some embodiments.

The pressure regulator 500 receives fluid from the pressurized fluid container 102 via the delivery conduit 108 and regulates the pressure of the fluid being released from the pressurized fluid container 102. The pressure regulator 500 may be located between the pressurized fluid container 102 and the outlet valve 700, wherein fluid being supplied from the pressurized fluid container 102 must first encounter the pressure regulator 500. The fluid can comprise a fluid and/or a gas, as discussed above. As the fluid within the pressurized fluid container 102 may be highly pressurized, the pressure regulator 500 may provide an initial pressure regulation or reduction. The pressure regulator 500 may provide a substantially constant pressure or may provide a varying pressure, wherein the varying pressure may comprise a greatly reduced pressure that corresponds to the pressure inside the pressurized fluid container 102.

The outlet valve 700 receives fluid from the pressure regulator 500 and controls the supply of the pressure-regulated fluid to an external fluid recipient. In some embodiments, the outlet valve 700 is installed to the pressurized fluid system 100 in a closed position and can be actuated only once, to an open state. The outlet valve 700 can comprise a non-return outlet valve 700 in some embodiments. After the one-time, non-return actuation, the outlet valve 700 remains open. Consequently, all pressure (above atmospheric pressure) in the pressurized fluid container 102 must be used or will be released. As a result, the pressurized fluid container 102 cannot be disposed of (or disconnected from a system or application) without all fluid pressure being relieved.

Figure 3:
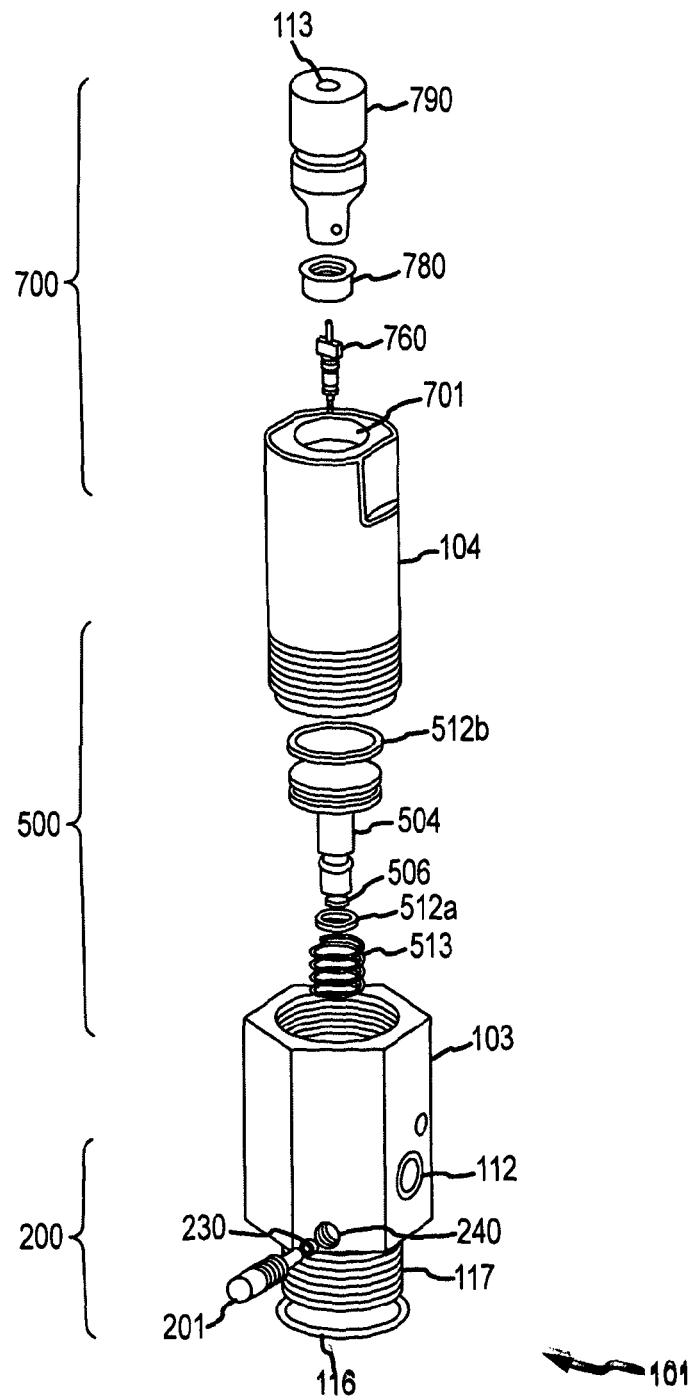
FIG. 3 is an exploded view of the container interface according to the invention.

FIG. 3 is an exploded view of the container interface 101 according to the invention. The container interface 101 in the embodiment shown includes the fill valve 200, the pressure regulator 500, and the outlet valve 700. The container interface 101 further includes the stopper 117 and the seal 116 that sealingly fit into the pressurized fluid container 102, and a body 103.

The fill valve 200 includes the fill port 112 and a fill valve bore 240, a fill valve member 201 located in the fill valve bore 240, and a fill valve seal 230 (see FIGS. 4-8 and the accompanying text).

Figure 9:
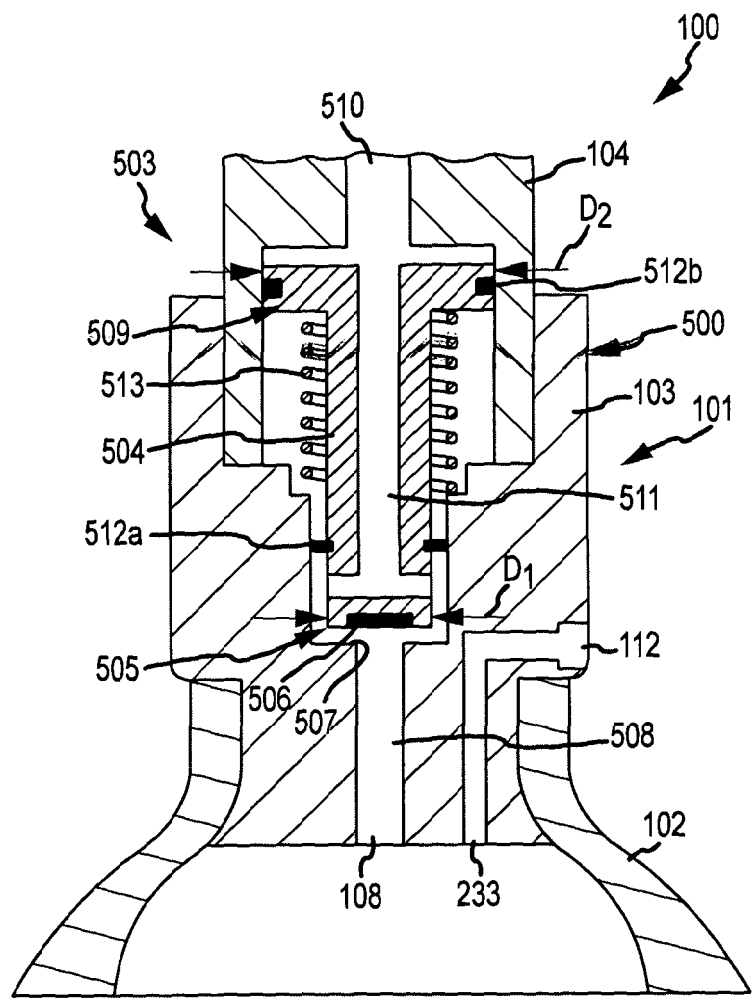
FIG. 9 shows a cross-sectional view of a pressure regulator of the container interface according to an embodiment of the invention.
Figure 10:
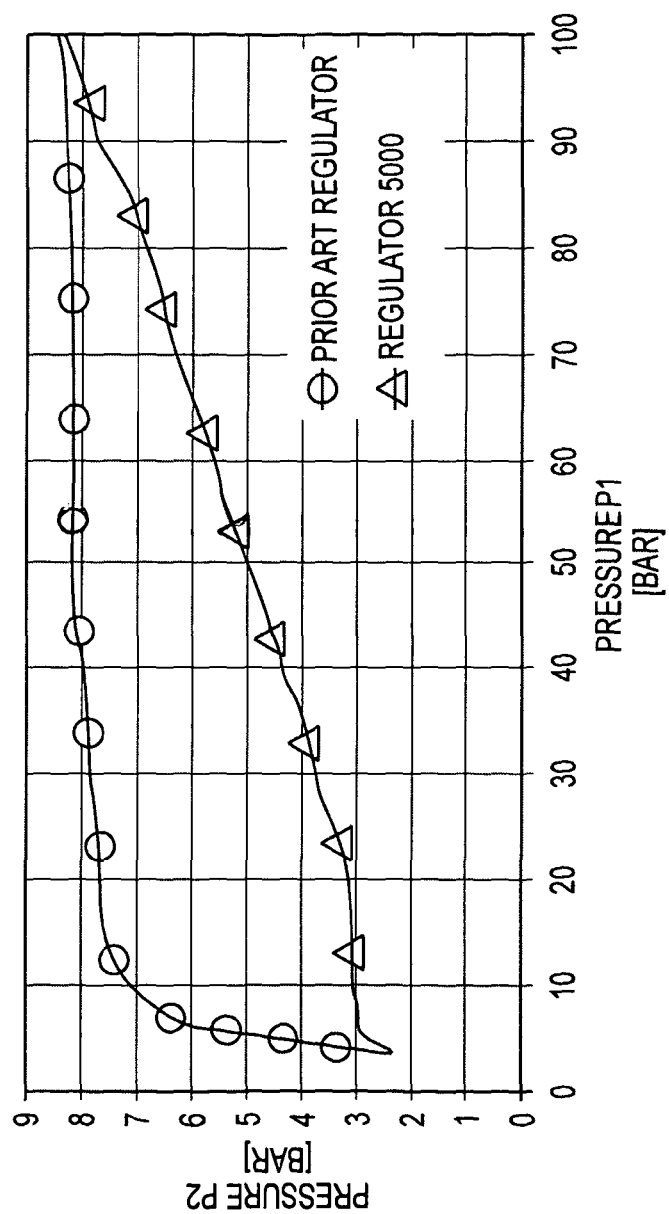
FIG. 10 shows a graph of the regulated pressure output from the pressure regulator compared to the pressure of the container as determined during an initial calibration, for example.
Figure 11:
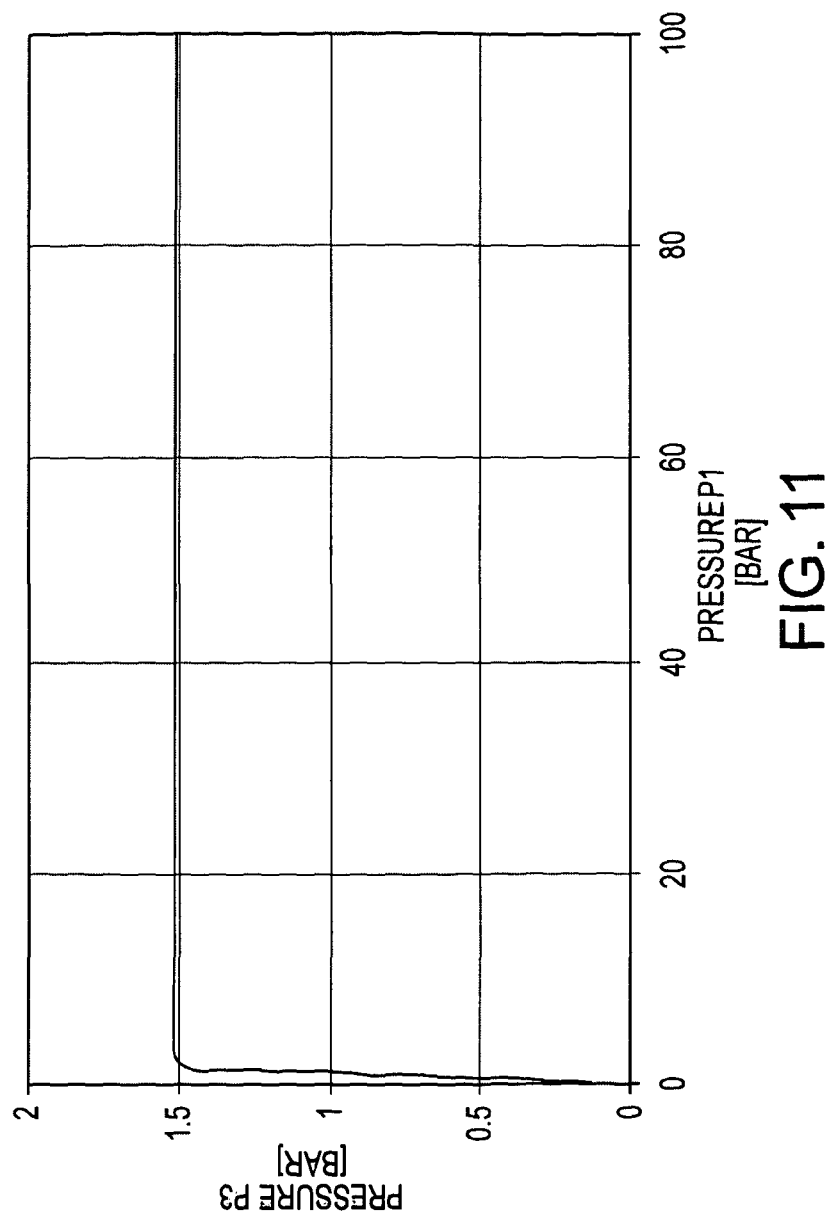
FIG. 11 shows a graph of the pressure output by a typical second stage pressure regulator, such as the pressure regulator shown in FIG. 1 with the pressure regulator positioned upstream.

The pressure regulator 500 includes a lower body 103, a regulator biasing member 513, a regulating piston 504 including a valve seat 506, and sealing members 512a, 512b assembled in the lower body 103 (see FIGS. 9-11 and the accompanying text). The regulating piston 504, the biasing member 513, and the sealing members 512a, 512b positioned within the lower body 103 comprise the pressure regulator 500. The regulating piston 504 is configured to move within the lower body 103 and regulate the pressure of the fluid being dispensed at the outlet port 113. Not visible is a delivery conduit 108 extending substantially through the container interface 101 and ultimately communicating with the outlet port 113. The delivery conduit 108 communicates with the pressure regulator 500 and the outlet valve 700.

The outlet valve 700 includes an upper body 104, an outlet valve actuator 790, a non-return member 780, and an outlet valve member 760 (see FIGS. 12-16 and the accompanying discussion below). The outlet valve actuator 790 resides in an outlet valve chamber 701 in the upper body 104. The outlet valve actuator 790 includes the outlet port 113. Fluid is received in the outlet valve chamber 701 from the pressurized fluid container 102. The outlet valve actuator 790 may move substantially reciprocally in the outlet valve chamber 701.

The outlet valve actuator 790 may be installed to a first, non-actuated position in the outlet valve chamber 701 when the outlet valve 700 is manufactured or assembled. The pressurized fluid container 102 may then be filled with fluid via the fill port 112. Thereafter, the outlet valve actuator 790 may be pressed to move the outlet valve actuator 790 to a second, actuated position within the outlet valve chamber 701. In the second, actuated position, the outlet valve 700 can control the dispensing of fluid from the outlet port 113.

Figure 4:
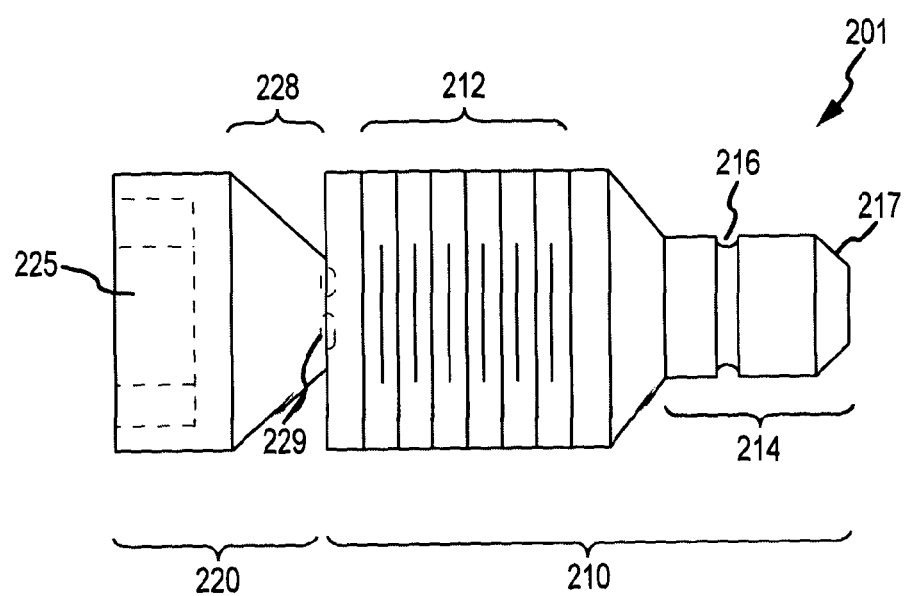
FIG. 4 shows detail of a fill valve member according to the invention.

FIG. 4 shows detail of a fill valve member 201 according to the invention. The fill valve member 201 comprises the movable valve component of the fill valve 200 (see FIG. 5 and the accompanying text below). The fill valve member 201 comprises a breakable component that allows an initial filling operation. The fill valve member 201 comprises a breakable component that then can block any attempts at subsequent refilling of the pressurized fluid container 102 through the fill port 112.

The fill valve member 201 comprises a valve member body 210, including a blocking portion 214 that performs the selective blocking, and a break-away head 220. The break-away head 220 is joined to the valve member body 210 by a breakable neck 228.

The breakable neck 228 may be smaller in size than the valve member body 210 or the break-away head 220. The smaller size may allow the break-away head 220 to be broken away from the valve member body 210. Alternatively or additionally, the breakable neck 228 may be made of a weaker or more brittle material than the body 210 or the break-away head 220. As a result, the breakable neck 228 may be the same size or only somewhat smaller than the valve member body 110 and the break-away head 220. In another alternative embodiment, the breakable neck 228 can include one or more fracture features 229 that weaken the breakable neck 228. The one or more fracture features 229 can comprise any feature that makes local fracturing more likely, including surface fracture features such as cuts, grooves, or hollows, for example, or internal fracture features including voids, including uniform or shaped voids.

The breakable neck 228 may be configured to break at a predetermined installation condition when the fill valve member 240 is moved to the substantially fully closed position in the fill valve 200. In some embodiments, the fill valve member 201 can be rotated in order to break the breakable neck 228. For example, the blocking portion 214 may contact a corresponding feature of the fill valve bore 240, preventing further inward movement of the fill valve member 201. Forced rotation of the break-away head 220 at that point may then break the breakable neck 228. Consequently, the fill valve member 201 can be designed wherein the break-away head 220 may require the application of a predetermined torque in order to break off the break-away head 220. Alternatively, a side-to-side motion of the break-away head 220 may break the breakable neck 228, including through fatigue of the material. The break-away head 220 then cannot be used to manipulate the fill valve member 201, preventing the fill valve 200 from being re-opened.

The break-away head 220 may include a manipulation feature 225. In some embodiments, the manipulation feature 225 can comprise a socket or shaped receptacle for receiving a tool, wherein the fill valve member 201 can be rotated by the tool. The tool may additionally be used to twist or bend the breakable neck 228 in order to snap the break-away head 220 from the valve member body 210. Alternatively, the manipulation feature 225 can comprise a gripping feature on an exterior of the break-away head 220, wherein the external manipulation feature 225 allows the break-away head 220 to be easily gripped and manipulated by hand. The manipulation feature 225 in such embodiments can include ridging, grooving, knurling, other texturing, or a shape or shapes that facilitate gripping. An external manipulation feature 225 may also be used to twist or bend the breakable neck 228 in order to snap the break-away head 220 of from the valve member body 210.

The valve member body 210 can include a threaded region 212 and the blocking portion 214. The blocking portion 214 can comprise a smaller portion that can be selectively moved to block or unblock the fill port 112, such as internally, within the container interface 101. The threaded region 212 can interact with a threaded bore region 243 of the fill valve bore 240 in order to move the blocking portion 214 inward or outward within the fill valve bore 240.

The blocking portion 214 in some embodiments includes a seal groove 216 and a chamfer 217. The chamfer 217 may be larger than, smaller than, or the same size as a seal surface 250 (see FIG. 6). The seal groove 216 receives a corresponding fill valve seal 230 (see FIG. 5). The fill valve seal 230 is substantially annular and seals the fill valve member 201 within the fill valve bore 240. In some embodiments, the fill valve seal 230 can comprise an O-ring, for example. However, any suitable seal can be used. The chamfer 217 can contact a corresponding seal surface 250 in the fill valve bore 240 and can create a surface-to-surface seal between the fill valve member 201 and the stopper 117. Therefore, the fill valve bore 240 can include a correspondingly shaped seal surface 250, such as an internal chamfer, shoulder, or bore end, for example.

Figure 5:
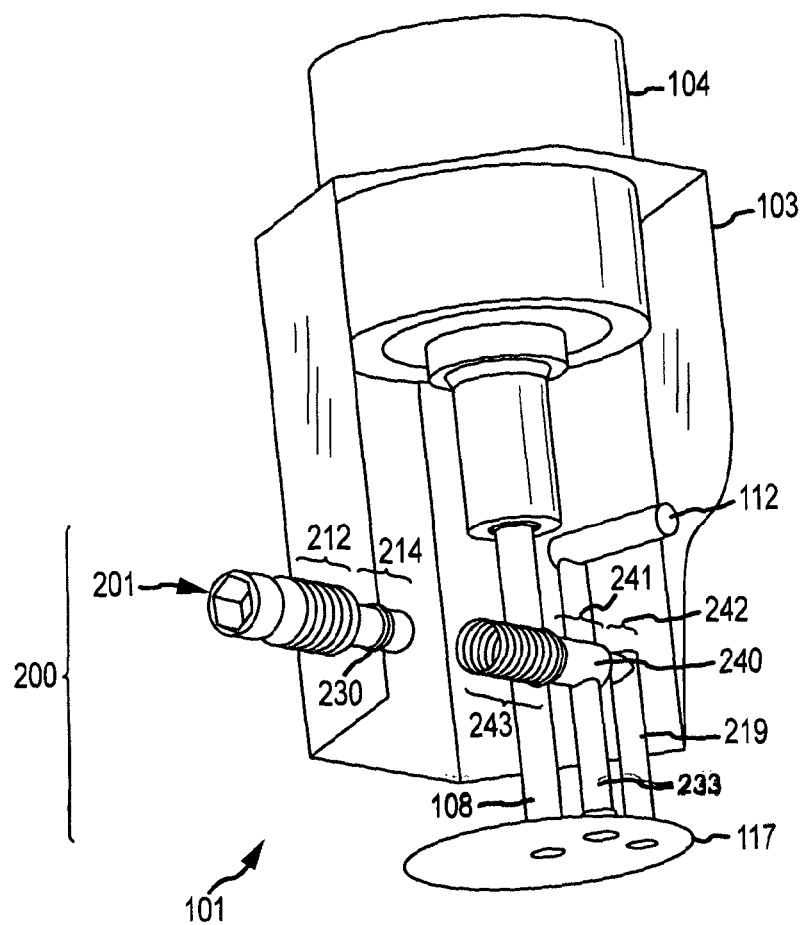
FIG. 5 is a partial cut-away of the container interface, showing details of the fill valve.

FIG. 5 is a partial cut-away of the container interface 101, showing details of the fill valve 200. The container interface 101 includes the delivery conduit 108 that couples the interior of the pressurized fluid container 102 to the outlet port 113. The container interface 101 includes the fill conduit 233 that couples the passage of the fill port 112 to the pressurized fluid container 102, passing through the stopper 117. The fill conduit 233 may run substantially parallel to the delivery conduit 108 in some embodiments. However, the fill valve 200 is not connected to the delivery conduit 108 and does not affect the delivery conduit 108.

The fill conduit 233 is interrupted by the fill valve bore 240. The figure also shows a connecting conduit 219 connecting the end of the fill valve bore 240 to the interior of the pressurized fluid container 102. It should be understood that this conduit is optional, as the fill valve bore 240 can alternatively comprise a blind bore. In another alternative, the fill conduit 233 can comprise a blind bore and the connecting conduit 219 couples the fill port 112 to the interior of the pressurized fluid container 102 through the fill valve bore 240.

The fill valve bore 240 receives the fill valve member 201. In some embodiments, the fill valve bore 240 includes a threaded bore region 243 that corresponds to and receives the threaded region 212 of the fill valve member 201, wherein the fill valve member 201 can be screwed into the fill valve bore 240. The fill valve bore 240 further includes a reduced diameter region 241 that receives the blocking portion 214 of the fill valve member 201 and a smallest diameter region 242 that may be blocked by the blocking portion 214. As a result, the fill valve member 201 will block the connecting conduit 219 when in a fully inserted position. In addition, the blocking portion 214 of the fill valve member 201, together with the fill valve seal 230, will block off the fill conduit 233 when in a fully inserted position in the fill valve bore 240, rendering the fill port 112 inoperable for re-filling of the pressurized fluid container 102 (see FIGS. 6-8 and the accompanying text below).

Figure 6:
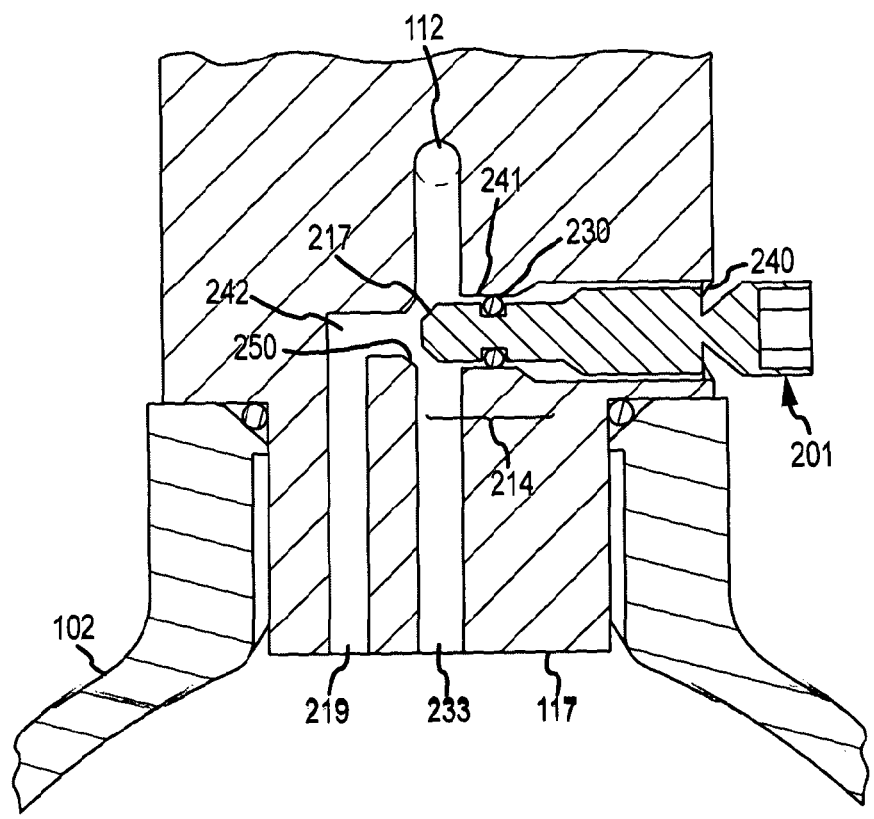
FIG. 6 is a cross-section that shows the fill valve member in an unblocking (i.e., fill) position in the fill valve bore.

FIG. 6 is a cross-section that shows the fill valve member 201 in an unblocking (i.e., fill) position in the fill valve bore 240. Fluid entering the fill port 112 can pass down through the fill conduit 233 and into the interior of the pressurized fluid container 102. In addition, some of the pressurized fluid may pass through the connecting conduit 219 and into the interior of the pressurized fluid container 102. The blocking portion 214 of the fill valve member 201 does not block the fill conduit 233, wherein fluid introduced at the fill port 112 will be able to travel down into the pressurized fluid container 102. However, it can be seen that the tip of the blocking portion 214 may project into the fill conduit 233 and yet still allow filling.

The fill valve seal 230 is shown in place in the seal groove 216 of the fill valve member 201. The fill valve seal 230 seals to the interior surface of the fill valve bore 240 in some embodiments. As a result, pressurized fluid cannot escape out of the fill valve bore 240.

Figure 7:
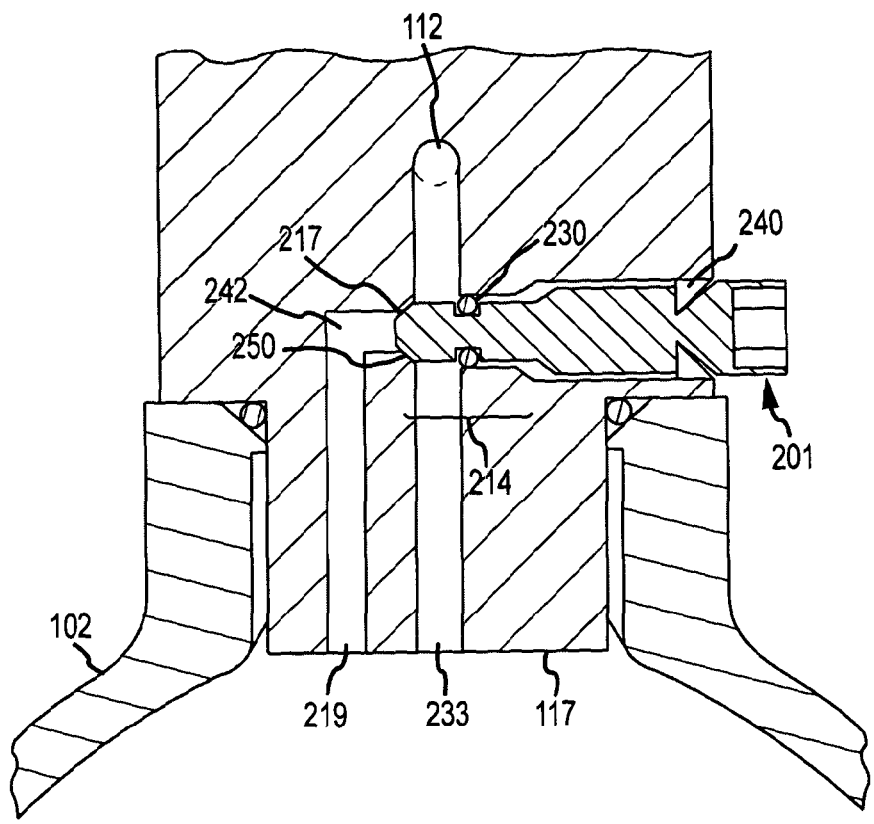
FIG. 7 is a cross-section that shows the fill valve member in a blocking position.

FIG. 7 is a cross-section that shows the fill valve member 201 in a blocking position. As a result, the blocking portion 214 of the fill valve member 201 can move into a substantially sealing contact with the seal surface 250 of the stopper 117. In some embodiments, the chamfer 217 of the blocking portion 214 can move into a substantially sealing contact with the seal surface 250.

The fill port 112 now cannot be used to fill the pressurized fluid container 102. The blocking portion 214 prevents fluid from passing from the fill port 112 to the fill conduit 233 and the connecting conduit 219. Further, the fill valve seal 230 prevents fluid from escaping out of the fill valve bore 240.

However, as is apparent from the figure, the fill valve member 201 could still be manipulated in order to unblock the fill port 112. Therefore, at this position, the pressurized fluid container 102 is still refillable.

Figure 8:
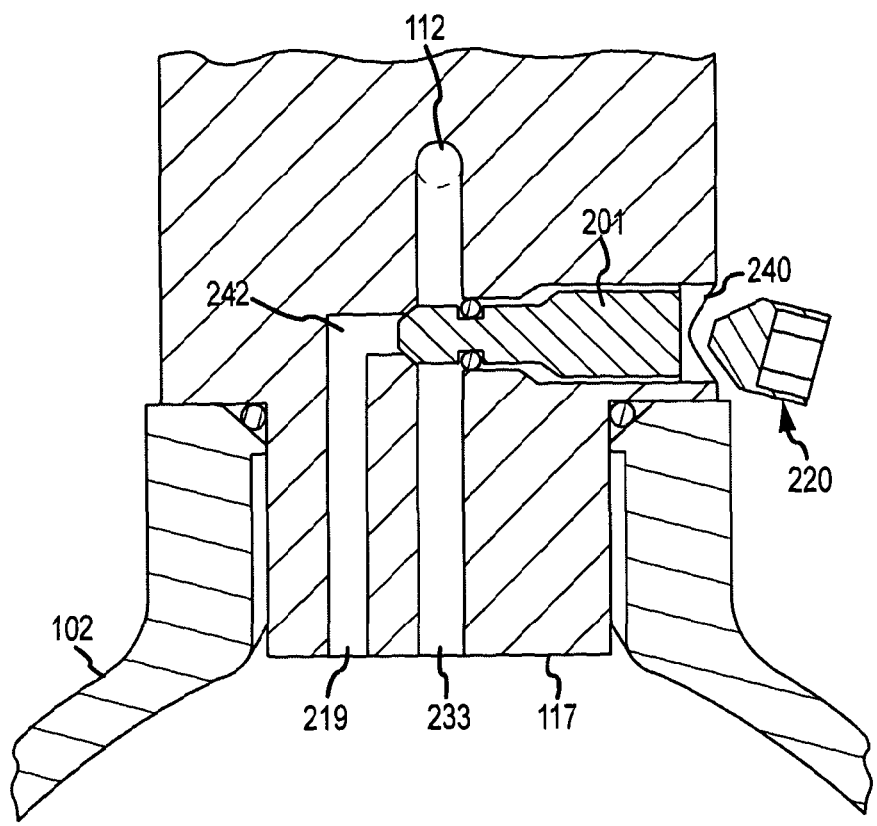
FIG. 8 is a cross-section that shows the break-away head of the fill valve member after being separated from the fill valve member.

FIG. 8 is a cross-section that shows the break-away head 220 of the fill valve member 201 after being separated from the fill valve member 201. The fill valve member 201 is now not movable within the fill valve bore 240. The fill valve member 201 now cannot be rotated without taking extreme measures, such as modification of the fill valve member 201. The fill port 112 now cannot be unblocked and the pressurized fluid container 102 is now non-refillable.

FIG. 9 shows a cross-sectional view of the pressure regulator 500 of the container interface 101 according to an embodiment of the invention. It should be appreciated that while the pressure regulator 500 is shown coupled directly to the pressurized fluid container 102, in other embodiments other components of the container interface 101, such as the fill valve 200, may be located between the pressure regulator 500 and the pressurized fluid container 102. Furthermore, it should be appreciated that in other embodiments, the pressure regulator 500 may be used alone without the additional components of the container interface 101 discussed herein. Therefore, the pressure regulator 500 should not be limited to use in combination with the various components of the container interface 101.

The pressure regulator 500 can include an inlet port 508 and an outlet port 510. The inlet and outlet ports 508, 510 may comprise a portion of the delivery conduit 108 that extends through the container interface 101. As discussed above, the pressurized fluid container 102 may be filled with a pressurized gas or a pressurized liquid. According to an embodiment of the invention, the pressure regulator 500 provides a substantially fluid-tight seal with the pressurized fluid container 102.

According to an embodiment of the invention, the pressure regulator 500 comprises a housing 503. The housing 503 may be separated between a lower body 103 and an upper body 104. According to an embodiment of the invention, the lower body 103 shown in this figure may comprise a portion of the lower body 103 of the container interface 101 or may comprise a portion of the container interface 101. The upper body 104 may comprise a portion of the upper body 104 of the container interface 101 or may comprise a portion of the container interface 101. The pressure regulator 500 can further include a regulating piston 504 movable within the housing 503. According to the embodiment shown, the upper body 104 comprises a component separate from the lower body 103. The upper body 104 may engage the lower body 103 using threads, adhesives, brazing, bonding, welding, mechanical fasteners, etc. In other embodiments, the upper body 104 and the lower body 103 may be integrally formed. According to an embodiment of the invention, the upper body 104 can retain the regulating piston 504 within the lower body 103. In the embodiment shown, the outlet port 510 is formed in the upper body 104; however, it should be appreciated that, in other embodiments, the outlet port 510 may be formed in the lower body 103.

According to an embodiment of the invention, the regulating piston 504 comprises a first end 505 and a second end 509. According to an embodiment of the invention, the first end 505 of the regulating piston 504 comprises a valve seal 506 configured to form a substantially fluid-tight seal with a valve seat 507 formed in the lower body 103. The first end 505 of the regulating piston 504 comprises a first cross-sectional width $D_1$. The first end 505 is shown exposed to the pressurized fluid cylinder 102 via the inlet port 508. Therefore, the first end 505 of the regulating piston 504 is subjected to the pressure of the pressurized fluid in the cylinder 502. The inlet pressure received by the fluid inlet 508 acts on the first end 505 of the regulating piston 504 across the first cross-sectional width $D_1$. The inlet pressure at the fluid inlet 508, therefore, acts to bias the regulating piston 504 up as shown in the figure to move the valve seal 506 away from the valve seat 507.

According to an embodiment of the invention, the second end 509 of the regulating piston 504 comprises a second cross-sectional width $D_2$. In the embodiment shown, the second cross-sectional width $D_2$ is greater than the first cross-sectional width $D_1$. The second end 509 is exposed to the fluid outlet 510 in the embodiment shown. Therefore, the pressure of the fluid at the fluid outlet 510 acts on the second end 509 of the regulating piston 504 across the second cross-sectional width $D_2$. The pressure at the fluid outlet 510, therefore, acts to bias the regulating piston 504 down, as shown in the figures. As can be appreciated, with the second cross-sectional width $D_2$ greater than the first cross-sectional width $D_1$, a lower pressure is required to act on the second end 509 to create an equivalent force on the first end 505. It should be appreciated that while the present invention refers to first and second cross-sectional widths $D_1$ and $D_2$, the regulating piston 504 is shown as comprising a substantially circular cross-section. Therefore, providing different cross-sectional widths essentially results in different cross-sectional areas on which the pressurized fluid acts. If the regulating piston 504 comprised a cross-sectional shape other than circular, the cross-sectional widths in at least one direction could be different between the first and second ends 505, 509 to provide different cross-sectional areas. Therefore, the present invention should not be limited to a regulating piston 504 with a circular cross-section.

According to an embodiment of the invention, the first cross-sectional width $D_1$ is between 1 mm (0.04 inches) and 5 mm (0.2 inches), and more preferably around 3.26 mm (0.13 inches). According to an embodiment of the invention, the second cross-sectional width $D_2$ is between approximately 15 mm (0.6 inches) and 17 mm (0.67 inches), and more preferably around 16.2 mm (0.64 inches). It should be appreciated that these are merely examples of suitable dimensions for the pressure regulator 500 according to one embodiment of the invention and those skilled in the art will readily recognize other suitable alternatives. For example, the entire pressure regulator 500 may be enlarged such that $D_1$ is increased from 3.26 mm (0.13 inches) to 9.78 mm (0.39 inches) while $D_2$ is increased from 16.2 mm (0.64 inches) to 48.6 mm (1.9 inches), thereby maintaining the ratio between $D_1$ and $D_2$ of approximately 20%. The 20% ratio is merely one example of a suitable configuration that provides a regulated output pressure that corresponds to the inlet pressure and should in no way limit the scope of the present invention. The cross-sectional widths $D_1$ and $D_2$ may be chosen such that the regulated pressure at the outlet port 510 corresponds to an inlet pressure at the inlet port 508 as described below.

According to an embodiment of the invention, the pressure regulator 500 further includes a fluid passage 511 formed in the regulating piston 504. The fluid passage 511 comprises a fluid communication path between the fluid inlet 508 and the fluid outlet 510. Fluid communication between the fluid inlet 508 and the fluid outlet 510 can be restricted to the fluid passage 511 using one or more sealing members 512a, 512b. The sealing members 512a, 512b may comprise O-ring seals, for example. However, other types of sealing members may be provided without departing from the scope of the present invention. According to the embodiment shown, the sealing members 512a, 512b substantially limit fluid communication between the inlet and outlet ports 508, 510 by requiring pressurized fluid to travel through the fluid passage 511. In other embodiments, the fluid passage 511 may be omitted along with the sealing members 512a, 512b thereby allowing the fluid to flow around the regulating piston 504.

According to an embodiment of the invention, the pressure regulator 500 also includes a biasing member 513. In the embodiment shown, the biasing member 513 is configured to bias the regulating piston 504 in an open position. In other words, the biasing member 513 biases the regulating piston 504 up as shown in the figures to move the valve seal 506 away from the valve seat 507 thereby allowing pressurized fluid to flow between the inlet port 508 and the outlet port 510 via the fluid passage 511. Therefore, according to an embodiment of the invention, the biasing member 513 is provided to create a normally open pressure regulator. Furthermore, the biasing member 513 can be adjusted to change a pressure differential required between the inlet port 503 and the outlet port 510 to actuate the regulating piston 504. Therefore, in addition to adjusting the first and second cross-sectional widths $D_1$ and $D_2$, the biasing member 513 can adjust the correlation between the input pressure and the output pressure of the pressure regulator 500. With the biasing member 513 in place and neglecting friction, a force balance is created as $F_{508}+F_{513}=F_{510}$, where $F_{508}$ is the force acting on the cross sectional area of the first end 505 (as determined by the first cross-sectional width $D_1$) of the regulating piston 504 by the pressure at the inlet 508, $F_{513}$ is the force of the biasing member 513, and $F_{510}$ is the force acting on the cross-sectional area of the second end 509 (as determined by the second cross-sectional width $D_2$) by the pressure at the outlet 510. Therefore, the regulating piston 504 will move within the housing 503 depending on the pressure differential between the container 102 and the pressure at the outlet 510. The pressure differential required to actuate the regulating piston 504 will depend upon the ratio between the first and second cross-sectional widths $D_1$ and $D_2$ (first and second cross-sectional areas) as well as the biasing force provided by the biasing member 513.

For example, with a relatively constant biasing force provided by the biasing member 513, the cross-sectional widths $D_1$, $D_2$ can be chosen such that if the force acting on the first end 505 by the pressure at the inlet 508 plus the force of the biasing member 513 is greater than the force acting on the second end 510 by the pressure at the fluid outlet by a threshold level, the regulating piston 504 will move up to unseat the valve seal 506 from the valve seat 507. With the regulating piston 504 unseated, pressurized fluid can flow through the fluid passage 511 towards the outlet 510. If the fluid is removed from the outlet 510 faster than it is provided, the regulating piston 504 will remain open. However, in many situations, the pressurized fluid is supplied to the outlet 510 faster than it is removed. Consequently, the pressure at the outlet 510 acting on the second end 509 of the regulating piston 504 may increase.

Once the pressure differential between the outlet 510 and the inlet 508 reaches a threshold difference, the regulating piston 504 will move down due to the increased force $F_{510}$ to close or at least partially close the fluid flow between the valve seal 506 and the valve seat 507. As can be appreciated, with the first and second cross-sectional widths $D_1$ and $D_2$ properly chosen, the threshold pressure at the outlet 510 required to move the regulating piston 504 will depend upon the pressure at the inlet 508, i.e., the cross-sectional widths $D_1$, $D_2$ can at least partially determine the required pressure differential. Consequently, the regulated pressure, i.e., pressure at the outlet 510 will correspond to the inlet pressure. This is because as the pressure within the container 102 decreases, $F_{508}$ also decreases. With a relatively constant biasing force by the biasing member 513, the force at the outlet $F_{510}$ required to bias the regulating piston 504 closed is correlated to the inlet force $F_{508}$.

Once the force $F_{508}$ acting on the first end 505 drops below a threshold level or the force $F_{510}$ acting on the second end 509 increases due to back-pressure at the fluid outlet 510, for example, the regulating piston 504 will move down to once again seal the valve seal 506 against the valve seat 507. The force $F_{509}$ may decrease as the pressurized fluid container 102 empties, for example. Conversely, the force $F_{510}$ may increase if a valve positioned down stream (non-return outlet valve 700) of the pressure regulator 500 is closed, for example. Therefore, if the downstream valve closes while pressurized fluid is provided to the inlet 508, the pressure at the fluid outlet 510 will build up, thereby closing the pressure regulator 500 or at least moving the regulating piston 504 towards the valve seat 507 to restrict the fluid flowing through the pressure regulator 500. Movement of the regulating piston 504 will continue to move as described above based on the forces acting on the piston 504.

As can be appreciated, with the first and second cross-sectional widths $D_1$ and $D_2$ chosen such that the regulated pressure at the outlet port 510 corresponds to the inlet pressure at the inlet port 508, as the contents of the pressurized container 102 decreases, the pressure at the outlet 510 will also decrease. This decrease in pressure will cause the regulating piston 504 to be biased up by the biasing member 513 to maintain the regulating piston 504 in an open position, i.e., a normally open regulator. Therefore, the pressure regulator 500 of the present invention will not trap pressurized fluid within the container 102, but rather, will allow substantially all of the pressure to exhaust to the atmosphere. As discussed above, this can be advantageous in embodiments where the pressurized fluid container 102 is recycled after a one-time use to prevent explosion or fire due to a built up pressure.

As mentioned above, the pressure regulator 500 is configured to output a regulated pressure at the fluid outlet 510 that corresponds to the inlet pressure, in this case, the pressure of the container 102. Consequently, an initial calibration can be performed and stored that relates the output pressure of the pressure regulator 500 to the inlet pressure as the inlet pressure decreases. As discussed above, the inlet pressure may decrease as the contents of the pressurized fluid container 102 decreases. FIG. 10 shows an example graph with the results of an example calibration.

FIG. 10 shows a graph of the regulated pressure output from the pressure regulator 500 compared to the pressure of the container 102 as determined during an initial calibration, for example. The graph also shows the outlet pressure of a typical prior art pressure regulator using the same inlet pressures. As can be seen, the pressure output by the prior art regulator remains relatively constant until the pressure of the container 102 (input pressure) reaches a threshold level, approximately 10 bar as shown in FIG. 10. Although a constant output pressure is considered advantageous in prior art pressure regulating systems, the constant output of the prior art regulator requires an upstream pressure gauge as there is no correlation between the input pressure and the outlet pressure. Therefore, while using the prior art regulator, there is no way to determine the pressure of the container until the output pressure rapidly decreases to zero as shown without providing an upstream pressure gauge. This rapid decrease in pressure is due to the configuration of the prior art regulator that closes when the input pressure (pressure of the pressurized fluid container) reaches a threshold level. Therefore, the upstream pressure gauge provides an indication or warning of the decreasing contents of the pressurized fluid container. While providing an upstream pressure gauge may be suitable in some situations, there are many applications where the increased cost associated with an upstream pressure gauge makes the system prohibitively expensive. One situation is where the pressurized fluid container 102, including the container interface 101, is designed to be disposable, or comprise a one-time use. In these situations, the extra cost of an upstream pressure gauge cannot be justified. However, users or operators still require some way to determine the amount of fluid remaining within the pressurized fluid container 102. The determination can be accomplished with the pressure regulator 500 of the present invention.

In contrast to the relatively constant output pressure of the prior art pressure regulator, the output pressure of the pressure regulator 500 of the present invention provides an output pressure that is correlated to the input pressure. As can be seen, as the inlet pressure decreases, the outlet pressure also decreases. Therefore, by measuring the output pressure using a downstream pressure gauge, such as the downstream pressure gauge 201, the input pressure (pressure of the pressurized fluid container 102) can be determined based on a previously generated graph such as shown in FIG. 10 or a look-up table, chart, etc. While the output pressure is shown as comprising an approximately linear relationship with the input pressure, it should be appreciated that other correlations are possible between the input and output pressures of the pressure regulator 500 of the present invention. Therefore, during use, the correlation may be used with a down stream pressure gauge, such as the pressure gauge 201, which as discussed above, are well known in the art and do not form a part of the present invention, to detect a pressure of the pressurized fluid container 102 or other device coupled to the pressure regulator 500.

FIG. 11 shows a graph of the pressure output by a typical second stage pressure regulator, such as the pressure regulator 122 shown in FIG. 1 with the pressure regulator 500 positioned upstream. Because the pressure regulator 500 substantially reduces the pressure of the pressurized fluid container 102 to a regulated pressure, the second stage pressure regulator 122 is only required to reduce the pressure a small amount. Consequently, the second stage pressure regulator 122 is capable of outputting an approximately constant output pressure (P3) regardless of the pressure in the fluid container 102 (P1) until the pressure in the fluid container 102 is almost fully depleted.

The present invention as described above provides a pressure regulator that outputs a regulated pressure that corresponds to an inlet pressure received by the pressure regulator. According to an embodiment of the invention, cross-sectional widths $D_1$ and $D_2$ of the first and second ends 505, 509 of the regulating piston 504 can be selected such that the regulated pressure corresponds to the inlet pressure. In one example embodiment, this correlation can be accomplished by providing a ratio of approximately 20% between $D_2$ and $D_1$. Furthermore, a biasing member 513 that provides a biasing force on the regulating piston 504 to bias the valve seal 506 away from the valve seat 507 can assist in determining the relation between the inlet and outlet pressures. In addition, with embodiment shown and described above, the biasing member 513 biases the regulating piston 504 away from the valve seat 507 such that the pressure regulator 500 comprises a normally open regulator. Consequently, when the pressure regulator 500 is implemented in a container interface, such as the container interface 101, the contents of a coupled pressurized fluid container 102 is not trapped within the container 102. In contrast, the pressure regulator 500 opens as the contents are depleted thereby allowing the pressurized fluid container 102 to substantially completely exhaust.

Figure 12:
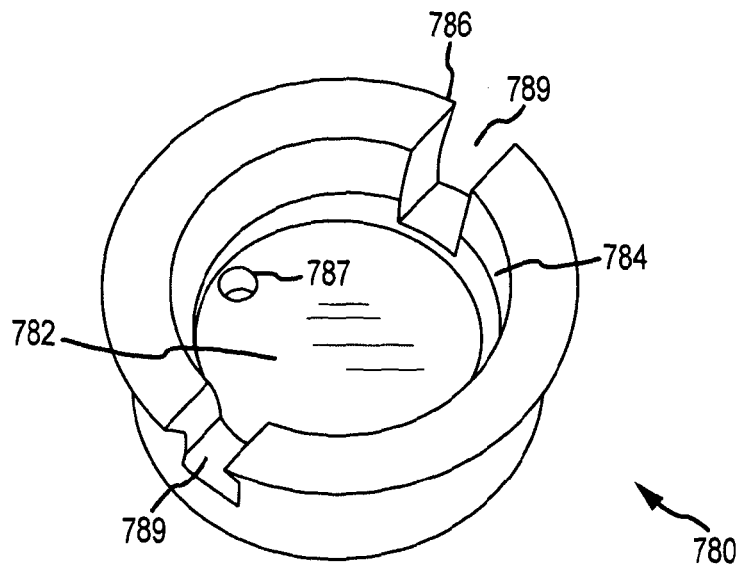
FIGS. 12-13 show a non-return member for an outlet valve according to the invention.
Figure 13:
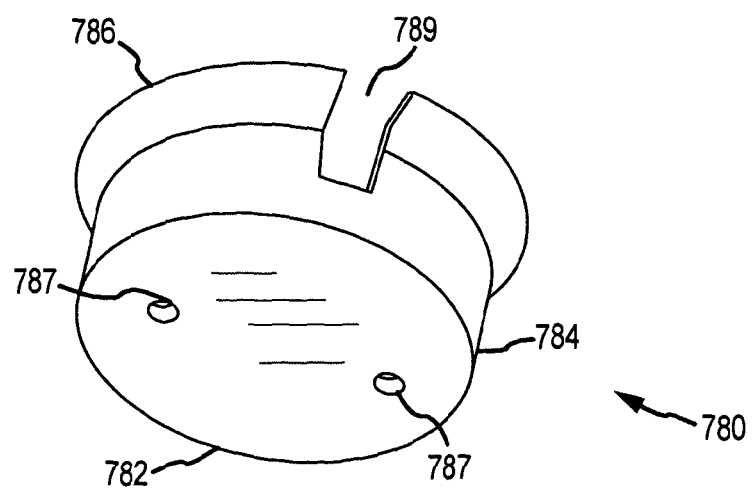

FIGS. 12-13 show a non-return member 780 for the outlet valve 700 according to the invention. The non-return member 780 in some embodiments blocks the outlet valve 700 in a substantially open, i.e., actuated, position. The fixing occurs when the outlet valve 700 is initially actuated. Consequently, the outlet valve 700 does not and cannot return to a closed position once it has been actuated/opened.

The non-return member 780 can be formed of any suitable material, including an at least partially deformable material. The non-return member 780 includes a circumferential wall 784, a bottom 782 extending at least partially across an interior of the circumferential wall 784, and a flange 786 extending outwardly from the circumferential wall 784. The flange 786 in some embodiments extends at least partially around a circumference of the circumferential wall 784 and is configured to engage the upper groove 722 or the lower groove 725 in the snap-fit arrangement. The bottom 782 is located at an end of the circumferential wall 784 in some embodiments. The flange 786 in some embodiments angles out from the wall 784 from an end opposite the bottom 782. The flange 786 in some embodiments comprises an angled face 793 angled with respect to an axis of the non-return member 780 and configured to allow the non-return member 780 to be moved deeper into the outlet valve chamber 701, and a perpendicular face 794 that is substantially perpendicular to the axis of the non-return member 780 and configured to prevent the non-return member 780 from being removed from the outlet valve chamber 701. However, other arrangements are contemplated and are within the scope of the description and claims. The purpose of the flange 786 is to allow the non-return member 780 to be moved in one direction only (see FIGS. 14 and 15, for example). The purpose of the non-return member 780 is to block the outlet valve 700 in an actuated (i.e., open) position.

The non-return member 780 in some embodiments may include one or more fluid apertures 787 in the bottom 782 that allow fluid flow through the non-return member 780. The non-return member 780 in some embodiments may include one or more fluid notches 789 in the circumferential wall 784 that allow fluid flow through the non-return member 780. The one or more fluid apertures 787 and the one or more fluid notches 789 comprise openings or passages in the non-return member 780. Consequently, the one or more fluid apertures 787 and the one or more fluid notches 789 allow pressurized fluid to flow past the non-return member 780 when the non-return member 780 is positioned in the outlet valve 700 and the outlet valve 700 is open.

The one or more fluid apertures 787 are shown as substantially round holes in the figure and the one or more fluid notches 789 are shown as substantially rectangular notches. However, the invention is not limited to these shapes or locations. It should be understood that the shape, number, location, and size of the one or more fluid apertures 787 and the one or more fluid notches 789 may be varied according to the fluid and according to a desired flow rate (or any other design considerations, such as structural integrity and ease of manufacture).

Figure 14:
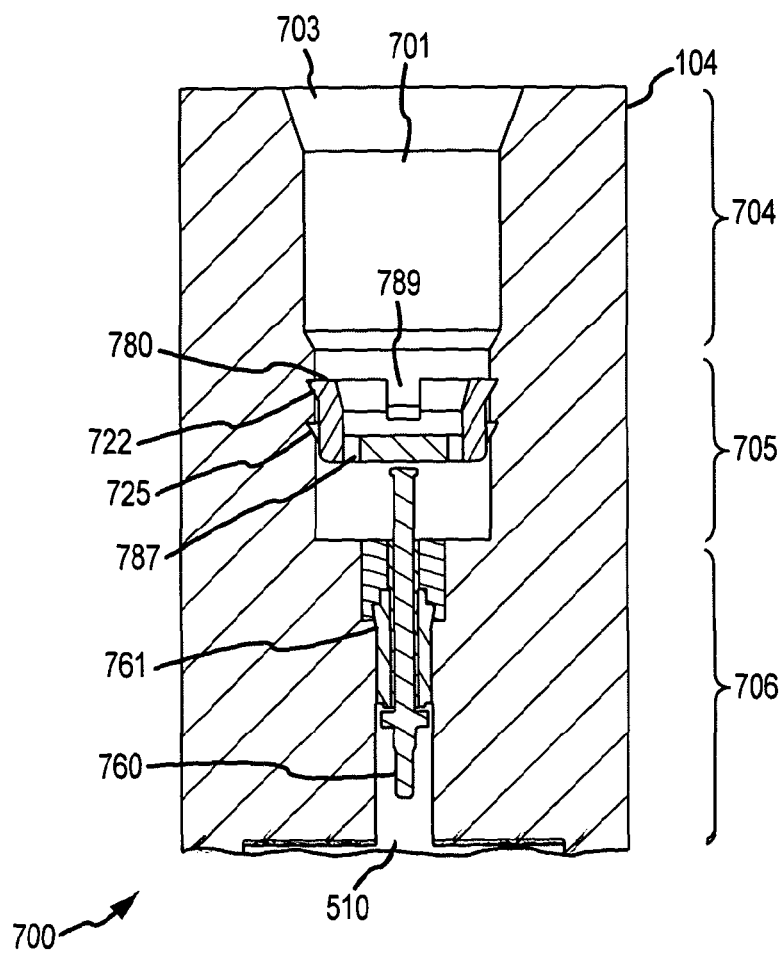
FIG. 14 shows the non-return member in an outlet valve chamber of the outlet valve.

FIG. 14 shows the non-return member 780 in an outlet valve chamber 701 of the outlet valve 700. The outlet valve 700 includes a valve member 670, the non-return member 780, and an outlet valve actuator 790 (not shown in this figure, see FIG. 15, for example). The outlet valve chamber 701 in the embodiment shown includes an upper chamber 704, a middle chamber 705, and a lower chamber 706. It should be understood that the outlet valve chamber 701 can include differing numbers of chambers and/or chamber configurations.

The upper chamber 704 receives the outlet valve actuator 790. The outlet valve actuator 790 can move substantially reciprocally in the upper chamber 704, such as to move the non-return member 780 and the outlet valve member 760. The outlet valve member 760 generally resides in the lower chamber 706. The outlet valve member 760 is configured to selectively block and unblock the lower chamber 706.

The non-return member 780 is located in the middle chamber 705. The non-return member 780 does not block or close off the middle chamber 705. The one or more fluid apertures 787 and the one or more fluid notches 789 allow fluid to pass through the middle chamber 705.

During manufacture or assembly, the non-return member 780 is inserted into the outlet valve chamber 701 and down into the middle chamber 705. A force may be required in some embodiments. The middle chamber 705 includes an upper groove 722 and a lower groove 725. Both the upper groove 722 and the lower groove 725 are shaped to substantially correspond to the flange 786 of the non-return member 780, wherein at least a portion of the flange 786 will fit into the upper groove 722 or the lower groove 725. In some embodiments, the non-return member 780 is at least partially resilient and the flange 786 snaps into the upper groove 722 or the lower groove 725.

The non-return member 780 is configured to be retained in one of the upper groove 722 or the lower groove 725 in a snap-fit arrangement. When the non-return member 780 is retained in the upper groove 722, the non-return member 780 does not contact the outlet valve member 760. When the non-return member 780 is retained in the lower groove 725, the non-return member 780 blocks the outlet valve member 760 in the substantially open position.

One or both of the upper groove 722 or the lower groove 725 are formed so as to prevent the non-return member 780 from being removed from the outlet valve chamber 701 once inserted. The upper groove 722 and the lower groove 725 may be the same size or may differ in size, if desired. In addition, the upper groove 722 and the lower groove 725 may be of the same shape or may differ in shape, if desired. For example, it may be desired that the non-return member 780 fit more snugly in the lower groove 725, as it may be desirable that the 780 not be moved from the lower groove 725 once it is moved into position in the lower groove 725.

The non-return member 780 will be positioned in the upper groove 722 during manufacture and assembly. In addition, the outlet valve member 760 may be inserted into the lower chamber 706 before the non-return member 780 is inserted. The outlet valve member 760 may further include a collet 761. The collet 761 may have a press or friction fit in the lower chamber 706. Alternatively, the collet 761 may be bonded, welded, or otherwise affixed within the lower chamber 706. The outlet valve member 760 may move within the collet 761. The outlet valve member 760 is configured to move between substantially open and substantially closed positions in the outlet valve chamber 701. The outlet valve member 760 moves substantially linearly from the open position to the substantially closed position in some embodiments.

In this position, the non-return member 780 does not contact or affect the outlet valve member 760. The non-return member 780 does not affect movement of the outlet valve member 760 when the non-return member 780 is retained in the upper groove 722. The outlet valve member 760 may be held in the upward, closed position by the pressure in the pressurized fluid container 102. No spring or biasing device may be needed to keep the outlet valve member 760 in the closed position.

Figure 15:
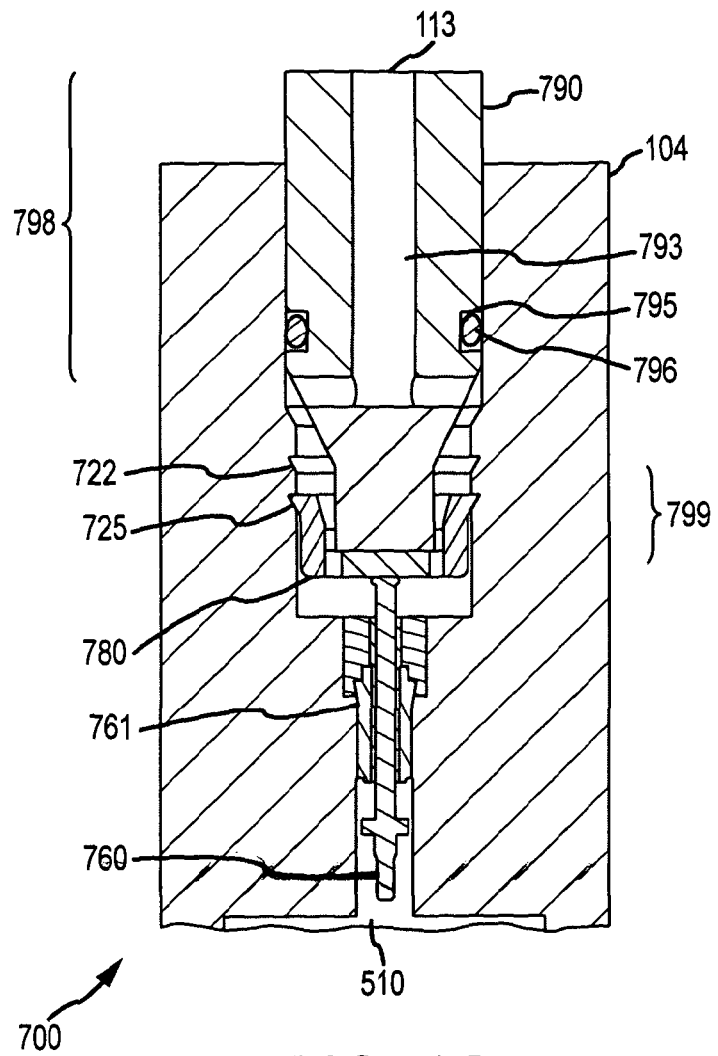
FIG. 15 shows the outlet valve wherein the outlet valve actuator is in position, at least partially residing in the outlet valve chamber.

FIG. 15 shows the outlet valve 700 wherein the outlet valve actuator 790 is in position, at least partially residing in the outlet valve chamber 701. A flare 703 may facilitate the insertion of the outlet valve actuator 790 into the outlet valve chamber 701. The outlet valve actuator 790 includes a main portion 798, a neck 799, and an actuator passage 793 that passes through the outlet valve actuator 790 and terminates in the outlet port 113. The outlet valve actuator 790 further includes a seal groove 795 and actuator seal 796, with the actuator seal 796 allowing the outlet valve actuator 790 to sealingly move up and down in the outlet valve chamber 701.

The outlet valve actuator 790 is configured to contact the non-return member 780 and move the non-return member 780 from the upper groove 722 to the lower groove 725 when the outlet valve 700 is actuated, thereby blocking the outlet valve member 760 in the substantially open position. When the outlet valve actuator 790 is first assembled to the outlet valve 700, it may contact or rest on the non-return member 780, but without moving the non-return member 780 from the upper groove 722. As a result, the outlet valve actuator 790 will not contact or open the outlet valve member 760.

In this figure, the outlet valve actuator 790 has forced the non-return member 780 from the upper groove 722 to the lower groove 725. The neck 799 of the outlet valve actuator 790 may be positioned near to, or in contact with, the non-return member 780. Due to the construction of the non-return member 780, the non-return member 780 will not be able to move upward again, and will remain engaged in the lower groove 725. Likewise, the downward movement of the outlet valve actuator 790 will push the outlet valve member 760 to an open position, as shown. In addition, the collet 761 may move a small distance farther down in the lower chamber 706. Pressurized fluid in the pressurized fluid container 102 may now pass around the outlet valve member 760, pass through the non-return member 780, travel into the actuator passage 793 in the outlet valve actuator 790, and flow out of the outlet port 113.

Figure 16:
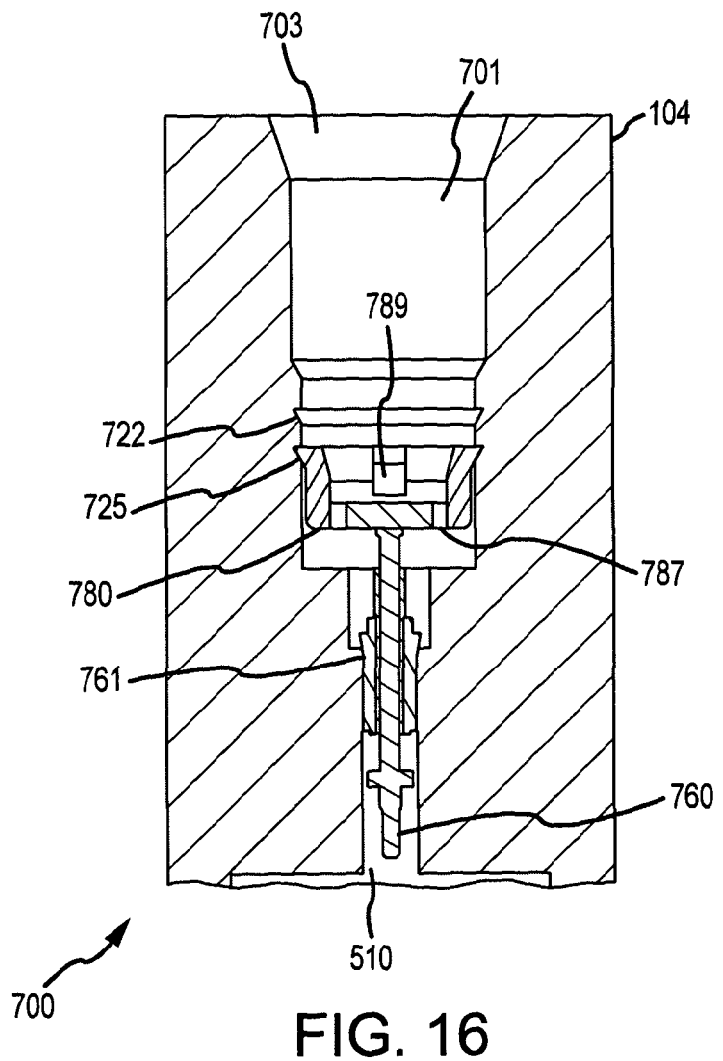
FIG. 16 shows the outlet valve after actuation and after the outlet valve actuator has been removed.

FIG. 16 shows the outlet valve 700 after actuation and after the outlet valve actuator 790 has been removed. It can be seen that the non-return member 780 remains in the lower groove 725. As a consequence, the outlet valve member 760 is blocked in the open position. No pressure will remain in the pressurized fluid container 102.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. It will also be apparent to those of ordinary skill in the art that the above-described embodiments may be combined in whole or in part to create additional embodiments within the scope and teachings of the invention.

Thus, although specific embodiments of, and examples for, the invention are described herein for illustrative purposes, various equivalent modifications are possible within the scope of the invention, as those skilled in the relevant art will recognize. The teachings provided herein can be applied to other pressurized fluid systems, and not just to the embodiments described above and shown in the accompanying figures. Accordingly, the scope of the invention should be determined from the following claims.

We claim:

1. A fill valve (200) adapted for use with a pressurized fluid container, the fill valve (200) comprising:
    an outlet port (113) coupled to the pressurized fluid container via a delivery conduit (108);
    a fill port (112) connecting to a fill conduit (233) that places the fill port (112) in fluidic communication with the pressurized fluid container, wherein the fill conduit (233) is not connected to the delivery conduit (108);
    a fill valve member (201) configured for selectively blocking the fill port (112) and configured to be non-openable after the fill valve member (201) has been moved to a blocking position that substantially closes the fill port (112), with the fill valve member (201) comprising:
    a valve member body (210); and
    a break-away head (220) joined to the valve member body (210) by a breakable neck (228), wherein the breakable neck (228) is configured to break upon receiving a predetermined torque when the fill valve member (201) is moved to a substantially fully closed position in the fill port (112); and
    a fill valve bore (240) of the fill valve that intersects the fill conduit (233), with the fill valve bore (240) receiving the fill valve member (201) and the fill valve member (201) being located in the fill valve bore (240) and can reside at unblocking and blocking positions in the fill valve bore (240), wherein the fill valve member is not movable in the fill valve bore once the breakable neck is broken.

2. The fill valve (200) of claim 1, with the breakable neck (228) being formed physically smaller than one or both of the valve member body (210) and the break-away head (220).

3. The fill valve (200) of claim 1, with the breakable neck (228) being formed of a more brittle material than one or both of the valve member body (210) and the break-away head (220).

4. The fill valve (200) of claim 1, with the breakable neck (228) including one or more fracture features (229).

5. The fill valve (200) of claim 1, with the valve member body (210) further including a blocking portion (214) configured to perform the selective blocking of the fill port (112).

6. The fill valve (200) of claim 1, with the valve member body (210) further including a blocking portion (214) configured to substantially sealingly fit against a seal surface (250) of the fill port (112) and selectively block the fill port (112).

7. The fill valve (200) of claim 1, with the break-away head (220) including a manipulation feature (225).

8. The fill valve (200) of claim 1, with the breakable neck (228) being configured to break at a predetermined installation condition when the fill valve member (240) is moved to the substantially fully closed position in the fill valve (200).

9. A method of forming a fill valve adapted for use with a pressurized fluid container, the method comprising:
    forming an outlet port in the fill valve wherein the outlet port is coupled to the pressurized fluid container via a delivery conduit;
    forming a fill port in the fill valve, with the fill port adapted to be in fluidic communication with the pressurized fluid container, wherein the fill conduit (233) is not connected to the delivery conduit;
    forming a fill valve member configured to selectively block the fill port and configured to be non-openable after the fill valve member has been moved to a blocking position that substantially closes the fill port;
    forming a valve member body;
    forming a break-away head joined to the valve member body by a breakable neck, wherein the breakable neck is configured to break when the fill valve member is rotated with a predetermined torque, and wherein the fill valve member is not movable in the fill valve bore once the breakable neck is broken; and
    inserting the fill valve member partially into the fill valve, wherein the fill valve member is located in the fill valve bore, and will not substantially block the fill port and wherein the fill valve member is configured to be non-openable after the fill valve member has been moved to a blocking position that substantially closes the fill port.

10. The method of claim 9, with forming the breakable further comprising forming the breakable neck physically smaller than one or both of the valve member body and the break-away head.

11. The method of claim 9, with forming the breakable neck further comprising forming the breakable neck of a more brittle material than one or both of the valve member body and the break-away head.

12. The method of claim 9, with forming the breakable neck further comprising including one or more fracture features.

13. The method of claim 9, with the breakable neck being configured to break at a predetermined installation condition when the fill valve member is moved to the substantially fully closed position in the fill valve.

* * * * *